March 3, 1942.  H. A. GOLLMAR ET AL  2,275,294
GAS TREATMENT PROCESS
Filed Aug. 27, 1938
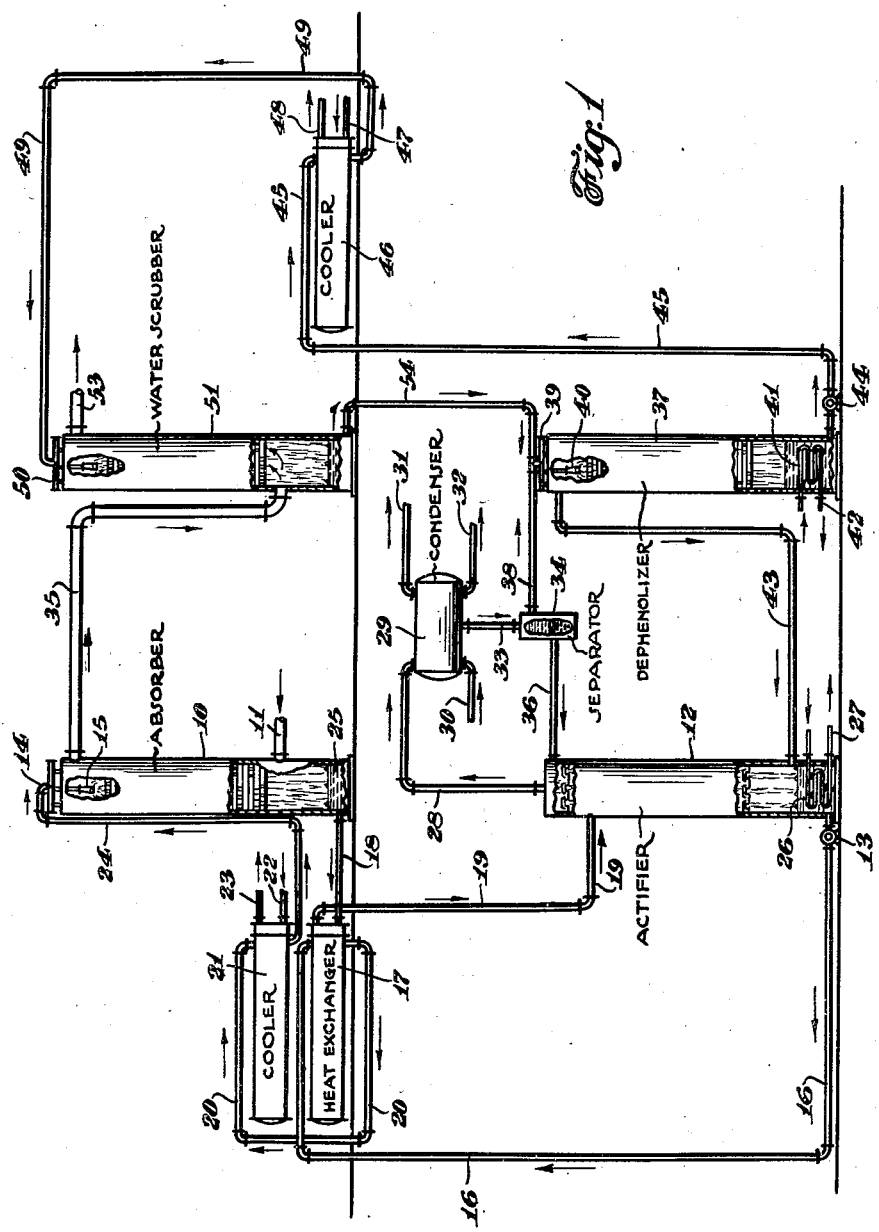
INVENTORS.
HERBERT A. GOLLMAR, &
BERNARD J.C. VAN DER HOEVEN.
BY
Henry Love Clarke
ATTORNEY.

Patented Mar. 3, 1942

2,275,294

UNITED STATES PATENT OFFICE 2,275,294

GAS TREATMENT PROCESS

Herbert A. Gollmar, Caldwell, N. J., and Bernard J. C. van der Hoeven, Pittsburgh, Pa., assignors to Koppers Company, a corporation of Delaware Application August 27, 1938, Serial No. 227,098

6 Claims. (Cl. 23—2)

The present invention relates in general to the treatment of gaseous mixtures containing weakly acidic gases and pertains more specifically to that improved process for separating gases of the nature of carbon dioxide, hydrogen sulphide, hydrogen cyanide, and the like, from mixtures in which they are present, by bringing such mixtures into contact with a solution containing an alkaline compound of phenol, or derivatives thereof, as for example sodium phenolate, which was patented January 14, 1936, in U. S. Patent 2,028,124, Joseph A. Shaw, and also with certain modifications thereof in Shaw U. S. Patent 2,028,125 of even date, both assigned to Koppers Company, the assignee of the present application.

According to the process set-forth in the first mentioned Shaw patent, gaseous mixtures containing weakly acidic gases of the nature of the above-recited are brought into intimate contact with an alkaline-reacting liquid containing a compound formed by reaction between an alkali-forming metal and a phenolic body whereby weakly acidic entities are absorbed out of the said gaseous mixtures into the washing liquid and from which they are liberated in a subsequent process step by heat, for example by boiling the washing liquid, thereby restoring the absorptive power of the said washing liquid after which it is recycled to the scrubbing step for the removal of further amounts of acidic gases.

In this regeneration of the washing solution to remove already absorbed acidic gases, a carrier gas or vapor is normally used to sweep out of the apparatus, or so-called actifier, the acidic gases which tend to be released at elevated temperatures from combinations with their absorptive ingredients in the scrubbing solution. The combined effects of raising the temperature of the solution to be regenerated and the sweeping thereout of the so liberated acidic gases is normally effected in the technological applications of the process in a single, simple step, i. e. by its boiling, preferably by indirect contact with relatively high pressure steam, although as disclosed in the first-mentioned of the Shaw patents an increment of the required steam may be used in indirect contact with the solution whereas the remainder, such as that used for the sweeping effect may be introduced directly thereinto from an outside source instead of employing steam derived from the boiling of the solution itself.

In the process, the so-called carrier or sweep steam or vapor that carries the liberated acidic gases out of the actifier apparatus is thereafter condensed along with significant amounts of associated phenol vapors, whereas the liberated acidic gases pass on through the condenser apparatus and are flowed to any preferred means for their utilization or disposal, as for example, to form sulphuric acid. The so-formed condensates must be returned to the main body of the scrubbing solution to save their valuable phenolic content which for economic and other reasons prevents their being flowed to sewage waste. In consequence of the fact that to save the phenol such aqueous condensates must be returned to the actifier apparatus, the introduction of direct steam into the scrubbing solution, from sources outside the system cannot be done, even though its quantity is limited solely to that or a part of that amount required as sweep or carrier steam, because such addition of steam will progressively dilute the active reagents in the bulk of the scrubbing solution. The progressive dilution of the solution will gradually reduce its effectiveness until it must be discarded or re-concentrated by special means outside the system, unless the raw gaseous mixture treated by the phenolate solution is sufficiently dry to evaporate, in the absorption step, all the condensed water added to the scrubbing system by the added direct-steam.

The purified gases leaving the absorber after contact with the solution of phenolate, also contains free phenol liberated from the phenolate by the absorbed acidic gases, and have a phenol content, which if not recovered therefrom, will gradually deplete the phenol content of the scrubbing solution, so that the provision of means for the return of such phenol to the scrubbing solution is also highly desirable from the viewpoint of process economy. It has already been proposed to wash the outlet gases of the process with a small counter-current flow of water or alkaline solution to remove this phenol content and to add such phenol-bearing solution to the main body of recirculating solution and thus provide for its re-use in the process. Such method of phenol recovery is effective in so far as actual recovery of phenol is concerned but unless the raw gaseous mixture undergoing treatment is sufficiently unsaturated with water vapor to permit its evaporating and thus removing from the scrubbing solution all the water added thereto in this manner, the main body of the scrubbing solution will be gradually diluted until in the end it will no longer be economically possible of use in the process.

The preferred concentration of alkaline phenolate employed in the recycled scrubbing solution for these processes causes its boiling point to be such that for its boiling in the actification step exhaust steam or steam of the lower pressures cannot be effectively utilized for the purpose. For purposes of lowering operating costs, it would be highly desirable to introduce cheap exhaust steam directly into the actifier as the carrier or sweep steam but this could not be done because it is necessary to return the same continuously, after condensation at the outlet of the actifier, to the bulk of the scrubbing solution in order to conserve the simultaneously condensed phenol; and the continuous additions of new quantities of exhaust steam directly into the solution would give rise to its continuous dilution.

The general object of the present invention is to contribute such improvements to the processes described in the above-mentioned Patents U. S. 2,028,124 and U. S. 2,028,125 as will even further reduce their present low costs of operation and enhance their economic aspects.

A principal object of invention is the provision of means whereby a substantial recovery of the somewhat volatile phenolic bodies present in vaporous form in the absorber outlet gases issuing from contact with the scrubbing liquid employed to carry the sodium phenolate, or the equivalent like, can be automatically and economically recovered and returned to the scrubbing liquid without bringing about its gradual dilution or reducing its efficacy: in short, a principal object of invention is to provide improved means for automatically maintaining at a substantially constant level the phenolic content of a given scrubbing solution in the stated process.

A further object of invention is to provide means whereby an important part of the steam required for the actification of the "spent" washing liquid, i. e., scrubbing solution that has already been in contact with the raw gaseous mixture and that must be regenerated by boiling before it is recycled in the process, can have its source in relatively low-pressure or even exhaust steam without in any way causing disadvantageous dilution of the reagents therein; thus reducing the expenditures for heat in the process. The invention has for further objects such other improvements and such other operative advantages or results as may be found to obtain in the processes or apparatus hereinafter described or claimed.

According to the present invention, the carrier or sweep-gas (steam or the equivalent), that during the regeneration of the spent scrubbing solution is vaporized out of the actifier apparatus in admixture with the acidic gases liberated from the spent solution and with some phenol, is led to a condenser where the sweep-gas and phenol are condensed and the acidic gases are passed on to their preferred disposition. The condensate comprising primarily condensed sweep-gas with its associated phenol, instead of being returned in liquid form as heretofor to the actifier apparatus to rejoin the main body of the scrubbing solution, is according to the present improvement separately led to suitable apparatus wherein it is boiled, the evolved hot vapors, which are primarily steam and phenol only, being then introduced directly into the spent phenolate solution undergoing regeneration where the phenol is then re-absorbed and the accompanying steam again serves as a carrier gas to remove fresh quantities of acidic gases from spent scrubbing solution. This is the preferred form of the invention but it will be obvious to those experienced in the art that some of the advantages of the present improvement can also be realized by returning the vapors evolved by the boiling of the actifier-condensate in the form of another condensate to the bulk of the scrubbing solution rather than as hot vapors.

The above-mentioned condensate from the actification step of the process, we have found, is of significantly lesser density and lower boiling point than the main body of the scrubbing solution and can thus be boiled with steam of lower temperature and pressure than the latter, so that this improved method of returning said condensate to the scrubbing solution in the form of hot vapors, rather than as a liquid condensate, is an economically important feature because it makes possible a simple and effective use, in the process, of exhaust steam, for example, that is at temperatures and pressures inadequate to boil the bulk of the scrubbing solution with its higher boiling point and as it is no longer necessary, to save phenol, to return all the aqueous condensate, but only the vapors of evaporation, now the phenol can be returned in a manner that will not cause dilution of the absorbent solution.

Also according to the invention, a fractional part of the said condensate obtained during the regeneration of the spent scrubbing solution is now utilized to remove phenols carried in the purified gases issuing from the step of absorbing the acidic gases without dilution of the absorbent solution. Boiling of said condensate preferentially transfers phenol therefrom into the evolved vapors so that the phenolic content in the undistilled residue is gradually diminished and, according to the present improvement, this boiling step is continued until the phenol-vapor pressure of the residue liquid at ordinary temperatures is not more but substantially less than that of the clean gases that have been removed from contact with the circulating phenolate solution. The residue so produced is then cooled and utilized to scrub phenol from the gases issuing from the absorption stage and then returned to the regeneration stage. The amount of such residue available for this purpose will in part naturally depend upon the amount of phenols originally present in the condensate started with, but practice has shown that even ten per cent. of that volume is effective for the desired purpose.

For those instances where the phenol content of the actifier-condensate is initially so high as to require so much boiling to recover the phenol that the volume of the boiled aqueous residue left, when the preferred vapor-pressure of phenol is reached, is inadequate to remove the phenols substantially completely from the gases issuing from the absorber, or to reduce their phenol content to a desired phenol vapor-pressure, the present invention has a further feature to increase the volume of such residue available for the stated purpose. To this end, the phenol-bearing condensate from the actifier is treated with an extracting medium, preferably liquid, in which phenol is more soluble than in water. After intimate contact therebetween has been established, the phenol-bearing extraction medium is separated from the aqueous portion of the condensate, the phenol content of the former being sent to the actifier apparatus whereas the latter is sent to the above-mentioned device where it is boiled to reduce its volume and phenol content sufficiently that it is adapted for use in the extraction of that phenol which has been volatilized into the treated gaseous mixture leaving the absorption step. In the actifier, the extracted phenol will be removed from the extraction medium by the alkali of the scrubbing solution and thus restored to effective use in the main body of the phenolate solution. It is of course obvious that special means may be employed to remove the absorbed phenol from the extraction medium, i. e. for example, distillation or the like, and the recovered phenol sent separately to the actifier and the extraction medium itself recycled to treat more of the condensed carrier gas. However, such step brings needless complication to the process because, if the extraction media are properly chosen their introduction into the actifier along with the phenol extracted from the actifier condensate will operate advantageously and they can be continuously and automatically recycled in the step of solution regeneration. For this purpose, hydrocarbon oils of not too high a vapor pressure at ordinary temperatures have been found effective. For example, those fractions of gasolene or kerosene, or aromatic oils having vapor-pressure characteristics similar to those of water, can be used; they will be volatilized out of the actifier, thereby serving as a carrier gas for the acidic gases; they can be condensed along with the steam and phenol vapors without significant loss and be separated from the aqueous fraction of said condensate, because of their lower density, by simple decantation; because they are good solvents for phenols, they reduce the phenol content of the said aqueous fraction below that which would obtain in their absence. Upon boiling a so-extracted fraction, a larger aqueous residue of a reduced phenol content employable to extract phenols from the gases leaving the absorption stage, will become available. This is a particularly important and effective feature for those applications of the phenolate process in which the volume of gases treated is large in respect of the volume of carrier vapor required to regenerate the spent scrubbing solution. The above succinct description of the improvement and certain features thereof provided by the invention will be hereinafter dealt with in greater detail by reference to the accompanying drawing.

In the accompanying drawing forming a part of this specification and showing for purposes of exemplification a preferred apparatus and method in which the invention may be embodied and practised but without limiting the claimed invention specifically to such illustrative instance or instances, the single figure shows a more or less diagrammatic view, partly in elevation and partly in vertical section, of apparatus for removing one or more acidic constituents from a gaseous mixture by means of the process under consideration and the improved features contributed to it by the instant invention.

Referring now to the drawing, and for the purpose of exposition, assuming that hydrogen sulphide is to be removed from a gaseous mixture containing it. The gaseous mixture enters absorber 10 through inlet pipe 11. The illustrated absorber is of the well-known hurdle-filled type, although other types of gas- and liquid-contact apparatus may be used. The gas flows upward through the absorber from bank to bank of hurdles while coming into contact with a countercurrent flow of alkaline-reacting solution containing sodium phenolate, or its equivalent, which is pumped in regenerated condition from the bottom of actifier 12 by pump 13 to a distributing system 14 at the top of the absorber 10 and into which it is distributed over the hurdle-packing by a plurality of sprays 15. In its flow from said pump 13, the regenerated solution passes successively through pipe 16, heat exchanger 17 where it comes into indirect heat exchange with spent absorbent solution flowing through pipe 18 from the bottom of the absorber to preheat the latter before its introduction into the upper part of the actifier through pipe 19. After partial cooling in the said heat exchanger 17, the regenerated solution then passes by means of pipe 20 into cooler 21 where it is further cooled to ordinary temperatures by indirect contact with a cooling medium, such as water, that flows into and out of said cooler through pipes 22, 23 as indicated by the arrows of the drawing. Thereafter the cooled and regenerated absorbent solution passes through pipe 24 into distributor-header 14 whence it is uniformly flowed over the packing of the absorber to remove, as it flows downwardly, fresh quantities of hydrogen sulphide from new quantities of the raw gaseous mixture entering said absorber through its inlet 11. The purified gases from which hydrogen sulphide has been removed leave the top of the absorber through outlet line 35.

Upon reaching the bottom of the lowest tier or bank of hurdle-packing, the absorbent solution, which contains newly absorbed quantities of the acidic gas, hydrogen sulphide, removed from the upwardly flowing gases, drains by gravity flow into the reservoir 25 in the bottom of the absorber where it collects in sufficient quantity to seal the pipe 18 through which regulated amounts continuously flow into heat exchanger 17 to be preheated in indirect contact with hot, regenerated absorbent solution that also passes therethrough from the bottom of the actifier by means of pipes 16, 20, as above described. The preheated spent solution then passes into the upper part of the actifier 12 by means of pipe 19.

Actifier 12 is a vapor and liquid contact tower comprising a plurality of the well-known bell-and-tray type sections and the spent absorbent solution as it is distributed over and flows downward through the plurality of trays is further heated by direct contact with an upwardly flowing current of steam, or the equivalent, produced by boiling such amounts of said solution as have collected in reservoir 26 at the bottom of the actifier and from which, when they have been thus substantially or adequately freed of hydrogen sulphide, they are recycled by pump 13 to the top of the absorber.

As hereinbefore mentioned, the heating and boiling in the actifier of the spent absorbent solution serves two purposes, namely, to increase the amount of hydrogen sulphide in the vapors above the solution and to provide a sweep or carrier gas which will assist in removing such liberated gas from the actifier apparatus.

Boiling of the absorbent solution in the reservoir at the bottom of the actifier is effected preferably by means of steam flowed through the heating coils 27; that is, by indirect contact with the steam.

The hot acidic gases and such vapors as steam and also some phenol leave actifier 12 through outlet pipe 28 and pass to the tube condenser 29 provided for their cooling. In this condenser, said gases and vapors are reduced to ordinary temperatures by indirect contact with cooling water that enters and leaves said condenser respectively through lines 30, 31. This cooling step is preferably so carried out that the steam and volatilized phenols present in the so-treated gaseous mixture are substantially entirely condensed whereas the permanent gases are led therefrom through outlet line 32. The condensed water and phenolic bodies flow from condenser 29 through pipe 33, along with any condensed oils employed as extraction media for the aqueous fraction, into separator 34, where they remain sufficiently long for proper separation by settling. The quantity and specific gravity of the extraction medium employed will determine the position of the aqueous fraction in the separator. In the drawing, the aqueous layer is the supernatant one but wherever this circumstance does not obtain, pipes 36, 38 leading respectively to the actifier and dephenolizer must be disposed to flow the oily layer to the former and the aqueous layer to the latter.

The heat required during the actification step may have its source entirely in steam at sufficiently high temperature and pressure in coil 27 to boil the scrubbing solution, that temporarily is retained in the bottom of the actifier. Ordinary exhaust steam of lower pressures is inadequate for this particular use because of the relatively high boiling point of the scrubbing solution. Where the available volume of higher pressure steam is insufficient or where its cost is excessive, higher pressure steam may be utilized for bringing the recirculated scrubbing solution up to the boiling point while at the same time lower pressure exhaust steam may be used as the carrier or sweep steam by introducing the same directly into the actifier or the hot solution. This expediency, however, dilutes the absorbent solution unless the gaseous mixture being treated in absorber 10 is sufficiently low in water-vapor content as to evaporate from the recycled solution all sweep steam introduced directly into the solution; otherwise, excess steam will continuously accumulate in said solution and gradually dilute the effective reagents therein and ultimately reduce its efficiency to such a level that it is no longer economically usable. It is not economically possible because of the value of the phenol in the condensate from the actifier, to keep the volume of the main body of the scrubbing solution constant by returning only a portion of such condensate to the main body of the solution. In short, any steam or water introduced directly into the absorbent solution cannot be removed therefrom without serious loss of valuable reagents unless the treated gas can evaporate water sufficient to keep apace of the water or steam additions thereto.

With the present invention, it is now possible in all applications of the phenolate process, to effect an economical removal of phenolic bodies from the gas absorber outlet and also to utilize relatively low pressure steam in the actification of the spent scrubbing solution, without causing any dilution of the recycled absorption solution.

In accordance with the invention, the condensate from condenser 29 is drained to separator 34 where the phenolic bodies present therein in excess of that quantity which is completely soluble in the aqueous portion of the condensate, are allowed to settle out. The heavier layer of phenolic oil is continuously returned directly to the actifier through pipe 36 to again assist in regeneration of spent solution flowing therethrough whereas the lighter aqueous layer is sent to dephenolizer 37 through conduit 38 and distributor-header 39 and the various pipes that lead to sprays 40 which serve to distribute said aqueous fraction over the packing in the dephenolizer. In dephenolizer 37, the downwardly flowing aqueous condensate is subjected to a counter-current flow of low pressure steam produced by evaporation of a portion of itself in the reservoir 41 located in the lower part of the dephenolizer, as shown in the accompanying drawing.

The boiling of this condensate is effected by the use of indirect steam in heating coils 42. The boiling point of the aqueous condensate being lower than that of the main body of the recycled absorbent solution, said condensate can be boiled with steam of lower temperatures and pressures than is the case with the main body of absorbent.

The present invention preferably provides that the steam and vapors, formed by revaporization of the condensed aqueous fraction from actifier 12, be returned to the main body of the scrubbing solution in vaporous form, as for example at the lower part of the actifier 12 by pipe 43. Such location for the low pressure vapor inlet is highly desirable because at that point the main body of the scrubbing solution is in a very highly regenerated state and more of the soluble alkali-metal, which was combined with absorbed acidic gases in the upper part of said actifier, is free of said gases and thus is available to assist in re-absorption into the main body of the solution, of the phenolic bodies present in the vapors flowed in through pipe 43. Good insulation of the pipe 43 makes it possible to utilize as sweep gas most of the steam that leaves the dephenolizer 37, for the purpose of sweeping out of the actifier those acidic gases liberated by heat from the solution flowing through the actifier. Such steam, after being recondensed in condenser 29 and redistilled in 37, can be continuously re-used for the same purpose. Thus, the instant invention, by re-introducing the actifier-condensate into the scrubbing solution in the form of vapor instead of liquid, makes possible a practical method of utilizing cheap, relatively low pressure steam in the actification step of the phenolate process for removing acidic gases from gaseous mixtures without dilution of the active reagents in the scrubbing solution. It is of course obvious that dephenolizer 37 need not necessarily be a separate unit but the actifier and the dephenolizer can be combined in a single tower, or the lowest tray-compartments of the actifier may be reserved to serve as the dephenolizer for the actifier-condensate in which cases of course the liquid residue of dephenolization does not mix with the main body of the absorbent solution.

As is well-known, the distillation of phenol-water mixtures preferentially removes phenol from the mixture; that is, the phenol is at higher concentration in the distillate than in the original mixture. This fact does however not obtain for phenol-water mixture in which the concentration of the phenol is such as to produce what is known as a constant-boiling mixture wherein the phenol and water are evolved at the same ratio even to complete evaporation. In other words, in a constant-boiling mixture it is not possible to reduce the phenol concentration in a distillation residue. When the actifier-condensates comprise phenol-water mixtures that are susceptible of yielding upon distillation aqueous residues of relatively low, or at ordinary temperatures no considerable, vapor-pressure of phenol, such aqueous distillation-residues are used to remove phenolic bodies carried in the gases issuing from the absorption step in the absorber 10. The total quantity of phenol in respect of the volume of treated gas will depend upon its outlet-temperature as well as its pressure, said quantity varying inversely as the pressure. The distillation residues of the aqueous portions of the decanted actifier-condensates, are reduced in the dephenolizer 37 to such a low vapor-pressure of phenol that when cooled they can be used to recover economically important quantities of phenolic bodies from the scrubbed gases passing out of the absorber. The aqueous residues are continuously forced, as they accumulate, in reservoir 41 in the bottom of the dephenolizer, by pump 44 and pipe-line 45 through cooler 46 where they are reduced to ordinary temperatures by indirect cooling with water circulated through the cooler by means of the inlet and outlet connections 47, 48. From the cooler the cooled aqueous residues flow through pipe 49 into a distributing system 50 atop water-scrubber 51 from which they are sprayed over the packing which substantially fills said water-scrubber. The phenol-bearing gases pass from the top of absorber 10 through pipe 35, into water-scrubber 51 at its lower part, and are thus brought into countercurrent contact with the aqueous scrubbing medium capable of absorbing phenols therefrom. The treated gases, greatly reduced in their phenol content, flow out of the water-scrubber at 53 and the phenol, recovered therefrom, is now in solution in the washing medium which flows through pipe 54 into distributor-header 39 where it joins aqueous condensate decanted from separator 34. The mixture is then introduced into dephenolizer 37 and boiled so that its phenol content can be again reduced by distillation, and the phenol returned by pipe 43 to the main body of scrubbing solution that is continuously recycled between the absorber 10 and actifier 12. The herein described invention thus provides novel and practical means whereby an economically important recovery of the phenols contained in treated gases leaving the so-called "phenolate" process can be effected by an aqueous medium and low pressure steam employed as an important quantity of the steam required for the regeneration of the spent scrubbing solution of that process without unwanted aqueous accumulations collecting in the system, or dilution of the gas scrubbing solution.

The quantitative adequacy of the dephenolized actifier-condensate for removal of phenols from the gases leaving the absorber, will depend amongst other factors on: the hydrogen sulphide content of the raw gas; the pressure under which it is treated in the absorption step and its temperature leaving the same; and also the efficiency of removal of the acidic gases. These conditions are reflected both in the quantity of carrier steam, or its equivalent, required to regenerate the spent absorption solution and in the total quantity of phenol to be removed from the gases after the absorber. The higher the hydrogen sulphide content of the raw gas, the greater will be the volume of actifier-condensate obtained. The greater the pressure under which the raw gas is treated, the less will be the total quantity of phenolic bodies necessary to be removed from the gases after the absorber. When both the pressure under which the raw gas is treated and its hydrogen sulphide content increases, the greater becomes the ratio between the quantity of sufficiently dephenolized actifier-condensate to the amount of phenolic bodies to be removed from the absorber outlet-gas. The higher such ratio becomes the higher will be the efficiency of removal of phenolic bodies, other things being equal. Conversely, in those instances where the hydrogen sulphide content of the raw gases is relatively small and they are scrubbed at about atmospheric or reduced pressures, the ratio between the quantity of actifier-condensate and the amount of phenol contained in the absorber outlet-gases will be less, a circumstance which tends to reduce somewhat the efficiency of phenol removal from the gases leaving the absorber.

Another factor affecting the efficiency of phenol removal from the gases leaving the absorber, is the phenolic content of the aqueous condensate introduced into the dephenolizer 37. If the phenol contained in said condensate is sufficient to constitute a constant-boiling mixture, a distillation residue cannot be obtained having a lower vapor-pressure of phenol than the original condensate. But it has been found by experiment that when the phenol content of the aqueous condensate introduced into the dephenolizer is even slightly less than that of a constant-boiling mixture concentration, a distillation residue of sufficiently reduced phenol vapor-pressure and in adequate volume to effect an economically satisfactory recovery of phenols from the absorber outlet-gases is possible, even though said residue is reduced to ten per cent or less of the original volume of condensate. The difficulties presented by the formation of a constant-boiling mixture of water and phenol in the aqueous condensate are somewhat mitigated by the fact that the phenolic solution from the water-scrubber is in most cases of a much lower phenol content than the aqueous actifier-condensate.

When the ratio between volume of the aqueous residue of preferred phenol vapor-pressure, obtained by distillation of the said actifier-condensate, and the total amount of phenol to be removed from the scrubbed gases becomes so small that the efficiency of the removal of the phenol from the gas is not high enough, as might obtain with, for example, coke-oven gas having a low content of acidic gases, and treated at nearly atmospheric pressures, the volume of such residual fraction can be greatly increased by extracting the aqueous fraction of the actifier-condensate that collects in separator 34 with a suitable medium that is preferably relatively insoluble in the said aqueous fraction. The extraction medium with its dissolved phenol is then separated from the aqueous condensate before the latter is sent to dephenolizer 37 to be distilled, and the extraction medium may be sent directly to the actifier, if the suitable extraction medium has been chosen. It is obvious that without departing from the intent and spirit of this novel feature, the extraction of dissolved phenol from the aqueous fraction of said condensate, as well as the removal of phenol from the extraction medium by distillation, or the like, can be carried on outside the process-system and only the recovered phenol be returned to the actifier, but for reasons of simplicity and low expense, that have been confirmed in practice, it is preferred to employ an extraction medium that can be effectively and continuously recycled between actifier 12, condenser 29 and separator, respectively 34. It is preferred to employ as an extraction medium, such hydrocarbons as have a boiling point near that of water and that are easily condensible, of low gravity and are good solvents for phenolic compounds, such for example as the higher boiling fractions of gasolene, kerosene, or the aromatic hydrocarbons such as benzol, toluene, xylene or mixtures thereof. When these substances are recycled between the actifier, condenser, and separator, in the manner above mentioned as preferable, they also function in the actification stage as sweep gases along with the steam. Since they are easily condensable, during such condensation, they are intimately distributed through the aqueous condensate thus automatically providing them with that intimate contact necessary to bring about an efficient extraction. From the separator 34, they can be drained with their phenol content into the actifier and, depending upon the density of the hydrocarbon-phenol mixture in respect of the aqueous layer separated in separator 34, the pipes 36, 38 must be disposed to drain off to the actifier and dephenolizer the appropriate layers.

In consequence of the phenomenon of hydrotropism exhibited by the scrubbing solution of alkaline phenolate, when the herein described process and the features of improvement contributed to it by the present invention are employed on gases such as certain refinery-still gases, resulting from the cracking of petroleum, and on most coke-oven gases still having their normal light oil content, it has been found in practice that sufficient oils suitable for the extraction of phenolic bodies from the aqueous fraction of the actifier-condensate are automatically extracted from the treated gases themselves. It has also been found that they accumulate in the actifier and are continuously recycled between it and the condenser and separator in a quantity adequate to extract sufficient phenols from said aqueous fraction so that its partial distillation in the dephenolizer provides enough dephenolized aqueous residue for scrubbing phenols from the absorber-outlet gases. Hence it is unnecessary in such event to add extraction oils to the scrubbing system from an extraneous source. It follows, of course, that in those instances where the oils automatically removed from the treated gases are insufficient in quantity to give a satisfactory extraction of the aqueous fraction of the actifier condensate, they can be added to the system from another source without departing from the intent of the invention.

The features of the above-described improvement are especially adapted for embodiment in any cyclic process comprising an absorptive and a regenerative step for separating constituents from a gaseous mixture by means of a recycled solution containing reagents that are somewhat volatilized into the gases leaving the absorption step and they will provide a novel, practical and inexpensive means of recovering, if not substantially all, in most instances at least sufficient of the said volatilized reagents to change prohibitive operating expense into costs that are economically bearable. The features of invention in no wise disturb the smooth operation of the principal steps of such a cyclic process for they are themselves cyclically operable in combination therewith.

It should be indicated that the invention does not require the collective employment of all the described features thereof since certain of them may be omitted and benefits still be contributed to the "phenolate" process. For example, in those cases where the phenol content of the outlet gases from the absorber is so low that there is no important economic advantage in its recovery, the step of scrubbing said gases with dephenolized condensate from the actifier may be dispensed with, while still employing the feature of providing for the re-introduction into the actifier of, either all or only part of, said aqueous condensate therefrom in vaporous form, rather than as condensed liquid, to obtain provides benefits in the form of heat economy by making cheaper, lower-pressure exhaust steam possible as a source of heat for the actification step.

In those circumstances where the phenolate process is employed for treating gaseous mixtures under conditions of absorption which causes the mixture to be reduced below their dew-point with collection of the precipitated water-vapor in the recirculated scrubbing solution thus tending to dilute it, the present improvement provides means whereby the volume of the said scrubbing solution can be kept substantially constant without the necessity for discarding large quantities of scrubbing solution carrying relatively high concentrations of the valuble phenolic reagent. By using any or a combination of the hereinabove described expedients for increasing the volume of dephenolized actifier-condensate residue obtained in dephenolizer 37, i. e. by more extensive extraction of the actifier-condensate with an immiscible solvent or flowing more carrier-gas through the regenerating solution, the highly dephenolized residue can be increased to an amount equal to the volume thereof required for dephenolizing the residual gases of absorption plus the volume of water condensed from the raw gas. This latter volume can be withdrawn from the process system with a relatively low content of reagent. In coke plants it can be added to the tar; or coke quenching system or to boiler feed-water on those localities where the phenolic content is higher than that allowed by local laws to be introduced into the stream systems.

By way of illustrating the advantages of the present invention the following operating results illustrative of specific applications are given:

A refinery still gas at a pressure of about 13.5 atmospheres and containing about 15,000 grains of hydrogen sulphide per M. C. F., measured under standard conditions of temperature and pressure, was continuously scrubbed with a recirculated solution of sodium phenolate, and 95 per cent. of the hydrogen sulphide content of the said gas was thus absorbed into the solution. For satisfactory regeneration of the spent phenolate solution, an aqueous condensate amounting to 18.2 gallons per M. C. F. of compressed gas was obtained from the outlet of the condenser located after the actifier. This condensate contained about eight per cent. of phenol in solution and was continuously flowed directly to the dephenolizer 37 and distilled with low pressure exhaust-steam. Simultaneously there was also flowed into said dephenolizer from the water-scrubber 51 1.8 gallons of an aqueous solution, containing about two per cent. phenol, per M. C. F. of compressed refinery still gas treated in the absorption step, said solution being a distillation residue resulting from boiling actifier-condensate in the dephenolizer. The mixture of actifier-condensate and water-scrubber effluent had a phenolic content of about 7.4 per cent. and was distilled until 90 per cent. of its volume had passed in the form of steam and phenol vapors into actifier 12 through line 43. The residue amounting to 10 per cent. by volume and containing about 0.5 per cent. phenol was continuously pumped from the lower part of the dephenolizer 37, through cooling coils and into the top of water-scrubber 51 at the rate of 2 gallons per M. C. F. of compressed gas. In scrubber 51 it was brought into direct contact with compressed gas that had passed through the absorper and still contained about 0.12 lb. of vaporous phenol per M. C. F. of compressed gas. Approximately 90 per cent. of the phenol in said absorber outlet-gases was recovered in this aqueous dephenolizer-residue and flowed back into the dephenolizer where it was mixed with new quantities of condensate flowing from the actifier. The phenol content of both was returned by distillation to the lower part of the actifier and redissolved into the main body of the recirculated phenolate solution, the distillation residue of the mixture being again recycled to the water scrubber with a phenol content of about 0.5 per cent.

In another application of the present invention, by-product coke-oven gas was scrubbed at substantially normal pressures with a recirculated solution containing sodium phenolate and at the rate of 4 gallons per M.C.F. of gas thereby effecting the removal from said gas of 85 per cent. of the 4750 grains of hydrogen sulphide per M.C.F. contained therein. In the continuous regeneration of the spent solution from such absorption step, 1.2 gallons of aqueous condensate flowed from the condenser per M.C.F. of treated gas along with a quantity of liquid hydrocarbons that amounted to approximately 0.1 gallon per M.C.F. of the treated gas. The hydrocarbons accumulated by absorption from treated gas in consequence of the phenomenon of hydrotropism exhibited by the phenolate solution and continuously recycled between the actifier, the condenser and the separator. The admixed aqueous and hydrocarbon condensates were flowed to the separator and, after separation, the latter was returned directly to the actifier in liquid form whereas the aqueous portion was sent to the dephenolizer and distilled until 80 per cent. of its volume had been flowed to the actifier in vapor form. The residual 20 per cent. by volume had been thus reduced to a phenol content of somewhat less than one per cent. and was then cooled and utilized to scrub phenol from purified gases that had flowed out of the hydrogen-sulphide absorption step, said gases still containing about 0.04 lb. phenol per M.C.F. A substantial recovery of these phenols was thereby effected and the scrubbing solution in which they were contained was continuously returned to the dephenolizer where said recovered phenols were distilled into the main body of the phenolate scrubbing solution as it flowed through the actifier. The phenol content of the purified coke-oven gas was thus reduced to less than 0.01 lb. per M.C.F.

The hydrocarbons incidentally recovered from the treated coke-oven gas because of their solubility in the alkaline phenolate solution were thus employed as an extraction medium for reducing the phenolic content of the aqueous portion of the actifier-condensate. It effected a reduction to a point below that which would otherwise obtain so that in its subsequent distillation step, less of said aqueous fraction would have to be distilled into the actifier before the phenolic content sufficiently so that the distillation residue could be employed to effect a satisfactorily efficient removal of phenols from the purified gases issuing from the hydrogen-sulphide absorption step. In end effect, these hydrocarbons, when employed in the described manner, served to increase the amount of dephenolized aqueous fraction of the actifier-condensate that was usable to remove phenols carried in vaporous form in the purified gases and in so doing made possible their more efficient recovery.

The amount of hydrocarbons thus automatically absorbed from the coke-oven gas by the alkaline phenolate solution is not large in volume and naturally depends in part on their partial pressure in the raw gas. In those instances where the accumulation of such substances in the cyclic step of spent solution regeneration is inadequate to provide a preferred extraction of phenols from the aqueous fraction of the actifier-condensate, appropriate hydrocarbons derived from some other source may be added to supplement, or an extraction medium of any suitable type may be employed within the scope of intent of the improvement.

The volume of aqueous condensate suitable for removing phenols from the purified coke-oven gas may also be increased by expedients other than extracting the aqueous actifier-condensate with a phenol solvent before it is introduced into the dephenolizer. For example, a volume of sweep-steam in excess of that required for satisfactory regeneration of the main body of phenolate solution may be flowed through the actifier. With all such possibilities, however, their economies and local circumstances must be considered; that is, the price of such excess steam and the value of the recovered phenol should be so balanced that te consumption of the former will be at least paid for by the value of phenol recovered. The feature of hydrocarbon extraction is of special value for those situations where the total volume of aqueous actifier-condensate is relatively small in respect of the quantity of phenol required to be extracted from the treated gases.

The invention as hereinabove set forth is embodied in particular form and manner but may be variously embodied within the scope of the claims hereinafter made.

We claim:

1. In a process of removing acidic gases such as hydrogen sulphide, carbon dioxide, and the like from mixtures which process comprises recirculating a sodium phenolate absorbent liquid through an absorption stage to absorb the acidic gases from the mixture and through an actification stage in which the absorbent liquid is regenerated by heating and condensing phenol and steam from the acidic gases liberated in the actification stage, the improvement comprising separating the phenol layer from the condensate and returning it to the actification stage, stripping the aqueous layer by heating to distill off further phenol and low pressure steam and returning these vapors to the actification stage, scrubbing the outlet gases from the absorption stage with the stripped aqueous portion from the stripping stage to remove traces of phenol from the absorption outlet gases, and returning the resultant phenol to the main body of absorbent liquid.

2. In a process of removing acidic gases such as hydrogen sulphide, carbon dioxide, and the like from gas mixtures which process comprises recirculating an alkaline absorbent liquid containing a phenolic compound through an absorption stage to scrub out the acidic gases from the gaseous mixture therein and through an actification stage in which the liquid is regenerated by heating, and condensing phenol and steam from the acidic gases liberated in the actification stage, the improvement comprising: separating the phenol layer from the condensate and returning it to the actification stage, stripping the aqueous layer by heating to distill off further phenol and steam and returning these vapors to the actification stage, scrubbing the outlet gases from the absorption stage with the stripped aqueous portion from the stripping stage to remove traces of phenol from the absorption outlet gases, and returning the resultant phenol-water liquor to the stripping stage.

3. In a process of removing acidic gases such as hydrogen sulphide, carbon dioxide, and the like from gas mixtures which process comprises recirculating an alkaline absorbent liquid containing a phenolic compound through an absorption stage to scrub out the acidic gases from the gaseous mixture therein and through an actification stage in which the liquid is regenerated by heating, and condensing phenol and steam from the acidic gases liberated in the actification stage, the improvement comprising: separating the phenol layer from the condensate and returning it to the actification stage, stripping the aqueous layer by heating to distill off further phenol and steam and returning these vapors to the actification stage, scrubbing the outlet gases from the absorption stage with the stripped aqueous portion from the stripping stage to remove traces of phenol from the absorption outlet gases, and returning the resultant phenol to the main body of absorbent liquid.

4. In a process of removing acidic gases such as hydrogen sulphide, carbon dioxide and the like from gas mixtures which process comprises, recirculating an alkaline absorbent liquid containing a phenolic compound through an absorption stage to scrub out the acidic gases from the gaseous mixture therein, and through an actification stage in which the liquid is regenerated by heating, and condensing phenol and steam from the acidic gases liberated in the actification stage, the improvement comprising: stripping the condensate separately from the main body of absorbent liquid by heating to distill off its phenol and steam and then returning these vapors to the main body of absorbent liquid in the actification stage, scrubbing the outlet gases from the absorption stage with the stripped aqueous portion from the stripping stage to remove traces of phenol from the absorber outlet gases, and returning the recovered phenol to the main body of absorbent solution.

5. A method as claimed in claim 2 and in which the phenol is extracted from the condensate with a phenol solvent before the stripping of phenol from the aqueous portion of the condensate.

6. A method as claimed in claim 2 and in which the phenol is extracted from the condensate with a hydrocarbon solvent for phenol before the stripping of the phenol from the aqueous portion of the condensate and both the phenol and hydrocarbon solvent returned to the actifier in a cyclic manner.

HERBERT A. GOLLMAR.
BERNARD J. C. van der HOEVEN.